SUPERREGENERATIVE AMPLIFIER

Filed June 7, 1950

INVENTOR.
JOSEPH C. TELLIER
BY
Dean V. Hazeltine
ATTORNEY

United States Patent Office 2,772,352

Patented Nov. 27, 1956

2,772,352

SUPERREGENERATIVE AMPLIFIER

Joseph C. Tellier, Penn Wynne, Pa., assignor to Philco Corporation, Philadelphia, Pa., a corporation of Pennsylvania Application June 7, 1950, Serial No. 166,606

2 Claims. (Cl. 250—20)

Figure 1:
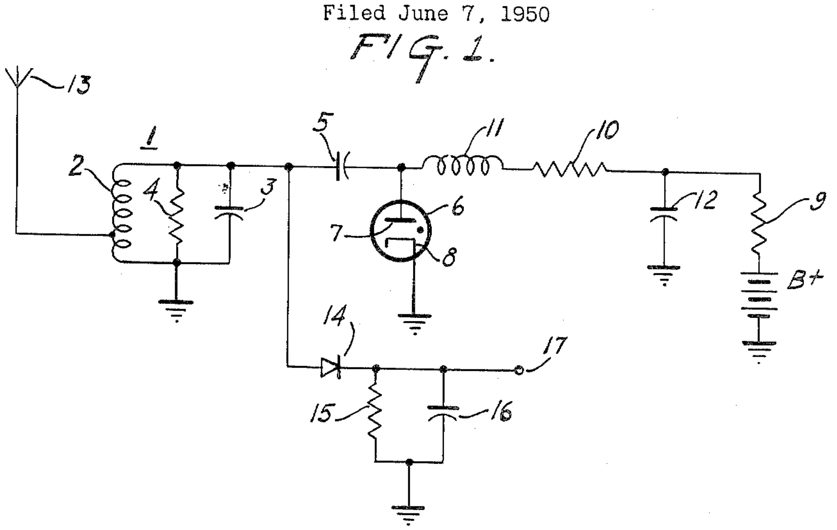

The present invention relates to means for varying the damping of a tuned circuit, and more particularly to a novel superregenerative oscillator.

For the present purpose, a superregenerative oscillator may be considered as comprising a normally damped or quenched tuned circuit, together with means which, in effect, operate intermittently to remove or to overcome the damping of the circuit during time-spaced intervals in which oscillations are permitted to build up in the tuned circuit at its resonant frequency. Upon the termination of each such interval, the circuit resumes its normal damped condition, and the oscillations previously developed in the circuit then begin to decay. The net effect of this alternate quenching and unquenching of the tuned circuit is to produce a series of pulses of superregenerative oscillations in the tuned circuit.

It is characteristic of such superregenerative oscillators that, when an input signal at a frequency near the resonant frequency of the tuned circuit is injected into the tuned circuit near the time when the damping is first removed, the superrregenerative oscillations achieve substantial magnitude more quickly, and the energies of the bursts of oscillation then produced are substantially greater, than in the absence of input signal. Furthermore, the stronger the input signal becomes, the greater are the energies of the successive pulses of oscillations.

To amplify and to detect amplitude-modulated carrier signals of relatively small magnitude, it is therefore only necessary to inject the received signals into the variably damped tuned circuit of such an oscillator, and to connect to the same tuned circuit a detector responsive to the quantity of energy in the pulses of superregenerative oscillations produced thereby.

The normal damping of the tuned circuit in such superregenerative oscillators may be effected by a resistive element connected to the circuit, or, alternatively, the inherent resistive losses associated with the reactive elements of the tuned circuit may in themselves provide the desired damping. To remove this damping during time-spaced intervals, it has been common in the past to employ vacuum tube circuits regeneratively connected to the tuned circuit to form an oscillator, the loop gain of the regenerative system being reduced below unity during intervals of damping by means of special quenching circuits.

Superregenerative receivers of this sort, in many forms, are known to the prior art and are generally characterized by their high sensitivity and relative simplicity of structure. However, while many of the prior art circuits are of very simple structure and comprise a very small number of components, it appears possible, in accordance with the present invention, even further to simplify a superregenerative receiver circuit and to reduce the amount of power required for its operation, while maintaining the advantages of high sensitivity. Such further simplification and reduction in the number of components required renders such a receiver even better adapted for use in portable equipment, as receivers for the automatic control of guided missiles and the like, and in other similar applications where minimization of bulk and weight is of the utmost importance.

It is therefore an object of my invention to provide novel means for intermittently overcoming or removing the damping of a tuned circuit.

A further object is to provide a superregenerative oscillator having a quenching system which is simple and conservative of power.

Still another object of the invention is to provide a complete superregenerative receiver which may utilize but a single two-electrode tube and no filament power.

These objectives are accomplished in accordance with the invention by employing a normally damped tuned circuit to which there is connected a gas tube relaxation oscillator. Associated with the tuned circuit are resistive losses which, as is well known, may be represented by an equivalent resistance of calculable value inserted in series in said tuned circuit, or in parallel therewith. During each cycle of operation of the relaxation oscillator the gas tube thereof exhibits momentarily a negative resistance characteristic which is used to counteract or to overcome the damping effects of the positive resistance associated with the tuned circuit. This gas tube may be connected effectively in parallel with the tuned circuit, in which case oscillations will be permitted to build up in the tuned circuit during those time intervals in which the absolute value of the negative resistance of the gas tube is less than the equivalent positive parallel resistance of the tuned circuit at resonance. Alternatively, the gas tube may be connected in series in the tuned circuit, in which case superregenerative oscillations are permitted to build up when the absolute value of the negative resistance of the gas tube exceeds the equivalent positive series resistance of the tuned circuit at resonance. Thus, when the circuit is properly adjusted in a manner more fully set forth hereinafter, a pulse of superregenerative oscillations will be produced in the tuned circuit during each cycle of operation of the relaxation oscillator.

To employ this superregenerative oscillator as a receiver, it is only necessary to inject the received signals into the tank circuit of the oscillator and to detect the variations in the energy of the pulses of oscillation produced thereby. Since the energy-detector may conveniently comprise a crystal and associated resistance-capacitance network, and the gas tube in the relaxation oscillator may be a cold-cathode gas diode, it is seen that a complete superregenerative receiver is provided which may utilize but a single two-element tube and which requires no filament power.

Figure 2A:
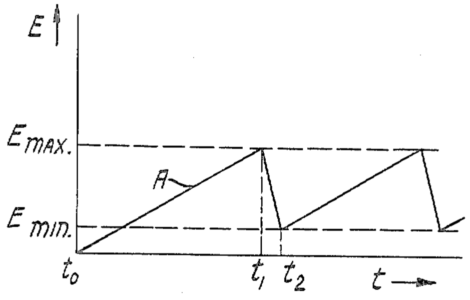
Figure 2B:
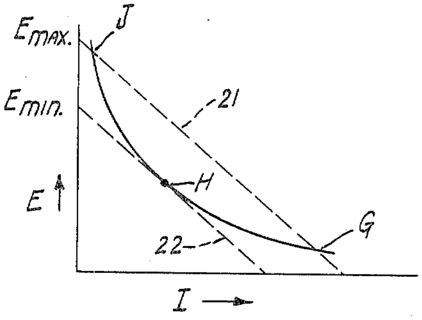
Figure 3:
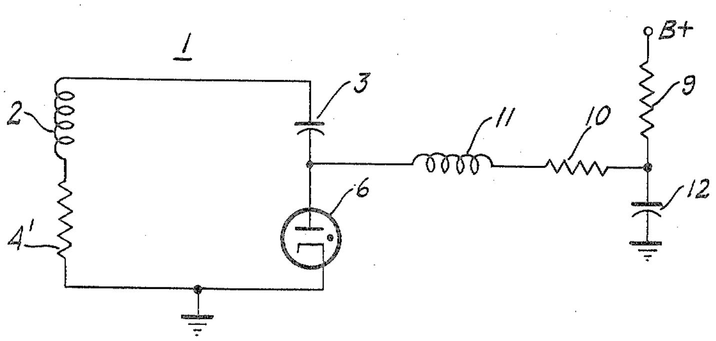

Other objects and features of the invention will become more readily apparent from a consideration of the following detailed description in connection with the accompanying drawings, in which:

Figure 1 is a circuit diagram of a superregenerative receiver embodying the principle of the invention, Figures 2A and 2B are graphical representations to which reference will be made in explaining the mode of operation of the invention, and Figure 3 is a schematic representation of another form of the invention employing an alternative method of connecting the relaxation oscillator to the tuned circuit.

Referring to Figure 1, in the embodiment of the invention there illustrated there is employed a tuned tank circuit 1, comprising an inductor 2, a capacitor 3, and a resistor 4 connected in parallel each with the others, one of the common connections of the three elements being grounded. Resistor 4 represents the total equivalent parallel resistance of tuned circuit 1, so that the losses in resistor 4 equal the total resistive losses of tuned circuit 1, whether due to lumped resistive circuit elements or to inherent resistance in the reactive elements of the circuit.

In the interest of clarity, it will be well to set forth the well known concepts of equivalent series and parallel resistance of a tuned circuit, and how they may be calculated. In considering tuned circuits which may possess resistances either in the form of lumped circuit elements or in distributed form, it is well known that the various resistive elements in the circuit, no matter how disposed therein, may be replaced by a single equivalent resistor of appropriate value connected either in series in, or in parallel with, the tuned circuit, without effecting the loss factor or Q of the circuit. It is, in fact, common to define the circuit Q by the relations:

$$Q=\frac{X}{R_s}=\frac{R_p}{X}$$

where $R_p$ represents the equivalent parallel resistance of the tuned circuit, $R_s$ is the equivalent series resistance of the same circuit, and X is the inductive reactance of the tuned circuit at resonance. The value of the equivalent parallel resistance of a circuit is then seen to be related to the equivalent series resistance thereof, by the formula $$R_p=X^2/R_s$$

It may readily be seen that, to calculate the equivalent parallel resistance of a tuned circuit, it is only necessary to add together the series resistances in the loop comprising the tuned circuit, to convert this total series resistance into a corresponding parallel resistance by means of the above formula, and then to add to this resultant parallel resistance all other resistances shunting the tuned circuit, by means of the usual rules for adding resistances in parallel. To find the equivalent series resistance, all parallel resistances may first be combined into a single total parallel resistance, which may then be converted by means of the above formula into a corresponding series resistance and added to the sum of the series resistances in the tuned circuit. From the above, it will be apparent that any tuned circuit is characterized both by an equivalent parallel resistance directly proportional to the circuit Q, and by an equivalent series resistance inversely proportional to Q, either of which may be considered as producing all the resistive losses of the circuit. For the present purposes, it is more convenient to consider the equivalent parallel resistance of tuned circuit 1, which is represented, as mentioned above, by the resistor 4.

Also connected in shunt with tuned tank circuit 1 is the series combination of coupling condenser 5 and gas discharge tube 6. Discharge tube 6 may comprise any of a variety of devices characterized by the production therein of a normal glow or arc discharge upon increasing the voltage applied across the device to a predetermined potential commonly referred to as the ignition potential. In the present embodiment, the gaseous discharge device is a conventional gas glow tube comprising a cold-cathode gas diode having a plate electrode 7 and an electron-emissive cathode electrode 8. Cathode 8 is connected to ground, while plate 7 is connected through coupling condenser 5 to the ungrounded end of tank circuit 1. It is understood that coupling condenser 5 has a capacity which is sufficiently large to provide a low impedance path therethrough for signals at the resonant frequency of tank circuit 1.

Also associated with glow tube 6 are circuit elements which cooperate to produce relaxation oscillations, and intermittently and cyclically to produce the above-mentioned discharge in tube 6. Thus a source of positive supply voltage designated B+ is connected through resistor 9, resistor 10, and inductor 11 in series, to plate 7 of tube 6, the value of the supply voltage being greater than the ignition potential of tube 6. From the low voltage terminal of resistor 9 to ground there is connected a condenser 12, the time constant of resistor 9 and condenser 12 in combination being the principal factor determining the frequency of relaxation oscillations. Resistor 10 represents the total effective discharging resistance for condenser 12, and may include not only the lumped resistance of any resistive circuit element located in the position shown, but also any other resistance in the discharge path of condenser 12 exclusive of tube 6. Thus resistor 10 may include the resistance of the various leads in the discharge path of condenser 12, as well as the inherent resistance of inductor 11. It will therefore be seen that the rate at which condenser 12 discharges when tube 6 is conducting, is determined principally by the time constant of condenser 12 in combination with resistor 10.

Inductor 11, included between the plate 7 of discharge tube 6 and condenser 12, possess an inductance which is sufficient to present a high impedance to signals at the resonant frequency of tank 1, and thereby effectively to isolate condenser 12 from tank circuit 1.

To provide a complete superregenerative receiver, there may be employed an antenna 13 suitably coupled to inductor 2 of tank circuit 1, and adapted to intercept signals to be received and to deliver the intercepted signals to tank circuit 1. Thus the antenna may be connected directly to a tap on inductor 2, as represented in the drawing. To detect the superregenerative oscillations, an energy detector is connected across the tuned circuit 1, this detector comprising, in the present instance, a crystal 14 in series with the parallel combination of a resistor 15 and a condenser 16. The time constant of resistor 15 and condenser 16 is preferably chosen so as to lie intermediate the period of the highest frequency to be detected and the period of the relaxation oscillations. The junction of crystal 14 with the parallel combination of resistor 15 and condenser 16 is connected to the output terminal 17 of the superregenerative receiver, at which output point detected signals corresponding to the amplitude modulation of received carrier signals are produced.

For a clearer understanding of the operation of my novel superregenerative receiver, reference may be made to the explanatory diagrams of Figures 2A and 2B. In Figure 2A, ordinates represent the voltage across condenser 12, while abscissae represent time. For convenience in explanation, it will be assumed that prior to a time $t_0$, condenser 12 is completely discharged. At time $t_0$ condenser 12 begins to charge through resistor 9 toward B+, as indicated by the rising portion A of the graph. During this time, gas tube 6 remains extinguished, and its plate voltage rises in substantially the same fashion as the voltage across condenser 12. However, at time $t_1$ the voltage across condenser 12 and at the plate of gas tube 6 reaches the ignition potential $E_{max}$ of the gas tube, and a glow discharge is initiated therein. Condenser 12 then begins to discharge through resistor 10, inductor 11, and gas tube 6 in series, until, at time $t_2$, the voltage at the plate of gas tube 6 equals the extinction potential $E_{min}$. At this time, the glow discharge is extinguished, and condenser 12 begins to recharge through resistor 9 toward the positive supply voltage B+. This operation is repeated during each cycle of the relaxation oscillator, a glow discharge thereby being produced in gas tube 6 during each cycle while the voltage across condenser 12 is falling from $E_{max}$ to $E_{min}$.

Figure 2B shows in full line the static volt-ampere characteristic of gas tube 6 for those times during which a glow discharge exists therein, as in the intervals between times $t_1$ and $t_2$ in the cycle of relaxation oscillation. In this figure, ordinates represent the voltage across tube 6, while abscissae represent the current through the tube. Each point on this characteristic represents a pair of possible values of the voltage across the tube and of the current through the tube which may exist simultaneously. The actual current and voltage which obtain in any particularly arrangement depend upon the value of the positive supply voltage and of the external resistance in series with the gas tube. It is important to note that the slope of the static characteristic is negative, that is, increases in current through the gas tube are accompanied by decreases in the voltage thereacross. Since the slope of this characteristic is equal to the ratio of the voltage across the tube to the current through the tube, it represents the effective resistance of the tube. It is therefore seen from the slope of this characteristic that gas tube 6 possesses a negative resistance characteristic during those time intervals in which a discharge exists therein.

Since this characteristic is not linear, the absolute value of the negative resistance may assume one value or another depending upon which point on the characteristic represents the operating point of the actual circuit utilized. Thus there are shown in Figure 2B, two dotted load lines 21 and 22 representing two particular conditions of circuit operation. These load lines are directly analogous to those often utilized in ordinary vacuum tube analysis, and represent the values of current and voltage which are simultaneously possible at the plate of gas tube 6 for certain specified values of positive potential and external series resistance. Load line 21 represents possible values of voltage and current for the case in which the supply voltage is substantially equal to the ignition potential $E_{max}$ of gas tube 6, and in which resistor 10 has a predetermined fixed value. This load line is seen to cross the voltage axis at the assumed voltage $E_{max}$ of the supply source, its slope being equal to the negative of the value of resistor 10. A glow discharge produced under these conditions then tends to stabilize at a point where the requirements of both the load line and of the static characteristic are met, and hence at their intersection. For reasons which have been adequately treated in the literature of the art, the stable operating point is the lower intersection G of the load line with the characteristic, the upper point of intersection J representing an unstable condition.

Also shown is dotted load line 22, corresponding to a supply voltage equal to $E_{min}$ and a value of resistance 10 which is the same as that represented by load line 21. Load line 22 is tangent to the static characteristic at point H, which point then represents the values of voltage and current which would be obtained in stable operation with the specific value of supply voltages and series resistance. It is noted that if the supply voltage is reduced below $E_{min}$, the series resistance 10 remaining the same, the load line no longer intersects the static characteristic, and there is no stable point of operation for the discharge. Under these conditions, the discharge is extinguished.

Now the supply voltage of gas tube 6 is the voltage across condenser 12. This voltage varies cyclically between the values $E_{max}$ and $E_{min}$, as indicated in Figure 2A. During the time when the condenser voltage is falling from $E_{max}$ to $E_{min}$, a glow discharge exists in gas tube 6, the operating point of which may be considered as traveling along the static characteristic curve of Figure 2B, from point G to point H. It will be appreciated that, by using different values of series resistance 10, the operating point of the discharge can be caused to travel over other portions of the static characteristic, and at a different rate. It is also to be noted that the value of the negative resistance of the static characteristic changes as the operating point moves from point G to point H. Thus, at point G, the negative resistance has an absolute value which is very low, while at point H the absolute value is substantially larger.

As has been pointed out hereinbefore, it is this negative resistance of the gas discharge which is used to overcome the effects of the positive resistance damping tuned circuit 1. The equivalent parallel resistance of tuned circuit 1 at resonance, which must be overcome by gas tube 6, can be readily calculated by conventional methods, as has been demonstrated hereinbefore. Now it is well known that a circuit becomes regenerative, and oscillations tend to build up therein, when the net circuit resistance is negative. If the resistance placed in parallel with tuned circuit 1 by gas tube 6 is designated ($-R_2$), the net resistance produced across tuned circuit 1 by the combination of the positive resistance $R_1$ of the tuned circuit and the negative resistance of the gas tube, will be $(-R_1R_2)/(R_1-R_2)$. From this expression, it becomes clear that the net resistance of tuned circuit 1 remains positive only so long as $R_2$ is greater than $R_1$. Thus, when the absolute value $R_2$ of the negative resistance provided by gas tube 6 becomes less than the positive resistance at resonance $R_1$ of tuned circuit 1, the net resistance across tuned circuit 1 becomes negative and oscillations build up therein.

It is in order to point out that, while the positive resistance of tuned circuit 1 at resonance is susceptible of ready calculation, the adjustment of gas tube 6 and its associated components comprising the relaxation oscillator to overcome this resistance, are more readily accomplished by experimental methods. The reason for this will be apparent from the following. The volt-ampere curve of Figure 2B represents the static characteristic of gas tube 6, and applies exactly only when very slowly varying voltages are applied to the tube. For higher frequency signals, the tube exhibits a dynamic characteristic which departs increasingly from the static characteristic as the frequency is increased. At extremely high frequencies, the dynamic characteristic may, in fact, differ radically from the static characteristic. The effects of such high frequency operation on the effective resistance of the gas tube are not susceptible of simple analysis; however, I have found that by experimental variation of the effective parallel resistance of the tuned circuit 1 at resonance, and by appropriate choice of gas tube 6, satisfactory operation of the circuit of Figure 1 may be obtained, especially for applications in which the resonant frequency of tuned circuit 1 is less than 50 kilocycles per second. Thus, when designing a circuit of the type illustrated in Figure 1, employing a particular type of gas tube 6, with a resonant frequency for tuned circuit 1 of 40 kilocycles per second for example, it is only necessary to increase the Q, and hence the equivalent parallel resistance, of tuned circuit 1 until the desired superregenerative oscillations are obtained. Under these conditions, the absolute value of the negative resistance of gas tube 6 at the resonant frequency of tuned circuit 1, assumes a value which is less than the effective parallel resistance of tuned circuit 1 for at least a portion of the interval between the times $t_1$ and $t_2$ during which the voltage across condenser 12 is falling from $E_{max}$ to $E_{min}$.

Upon proper adjustment of tank circuit 1 and the parameters of the relaxation oscillator connected thereto, in accordance with the above teachings, bursts of superregenerative oscillations will be produced across tank circuit 1, the energies of which bursts depend upon the magnitude of the input signals supplied to inductor 2 by antenna 13. These bursts are then detected by crystal rectifier 14 and integrated by the parallel combination of resistor 15 and condenser 16. As noted hereinbefore, the time constant of resistor 15 and condenser 16 in combination may suitably be intermediate the period of the quenching frequency and the period of the highest modulation frequency to be detected. In this way, substantial response to the modulating frequencies may be obtained, while interfering signals at the quench frequency are discriminated against. Thus at the output terminal 17 of the superregenerative receiver, there will be presented a satisfactory reproduction of the modulation of the carrier wave signal intercepted by antenna 13.

Figure 3 illustrates an alternative circuit arrangement in which the gas discharge tube is connected in series in the tank circuit rather than in parallel therewith, as in the embodiment first discussed. The circuit shown constitutes a superregenerative oscillator, which may of course be supplied with carrier wave signals to be received and which may also be connected to a suitable detector, as in Figure 1. In the diagram, tuned tank circuit 1 is similar to that of Figure 1, except that equivalent parallel resistor 4 of Figure 1 has been replaced by an equivalent series resistor 4', connected in series in the tank circuit and representative of the same amount of electrical circuit loss as resistor 4, while gas tube 6 has been arranged in series, rather than in parallel, in the tank circuit. As indicated hereinbefore, the value of resistor 4' may be obtained by conventional methods, either directly or from a knowledge of the value of the equivalent parallel resistor 4 of Figure 1, and represents the sum of all sources of circuit loss. The remaining elements constituting the relaxation oscillator may all be substantially identical with corresponding elements of Figure 1, both in values and in arrangement. However, it is noted that coupling condenser 5 of Figure 1 is not required in the present circuit, condenser 3 serving as a blocking condenser to prevent the D.-C. potential at the plate of gas tube 6 from being short-circuited to ground by inductor 2 and resistor 4'.

To overcome the effect of the equivalent series damping resistor 4', and thereby to produce undamping of tank circuit 1 and the building up of superregenerative oscillations therein, it is necessary that the negative resistance of discharge tube 6 attain, in the interval between $t_1$ and $t_2$ of Figure 2A, an absolute value equal to or greater than the resistance of resistor 4'. As in the case of the embodiment of Figure 1, the proper adjustment of the parameters of the relaxation oscillator, the choice of gas tube 6, and the adjustment of the tuning and Q of tank circuit 1 to produce the desired frequency, duration, and extent of unquenching, may best be determined experimentally.

As illustrated in the drawings of Figures 1 and 3, the glow discharge tube 6 may be one which does not require filament power for heating the cathode thereof. In this event, it will be noted that no filament power is required at any point in my superregenerative receiver, and that the components required to produce sensitive reception and detection are few in number and small in size. However, if desired, it is obvious that other types of glow discharge tubes may be employed, some of which may require filament power or may employ additional electrodes.

Although the invention has been described with reference to a particular embodiment thereof, many variations in the structure and arrangement of the various specific components will occur to those skilled in the art, which variations may be effected without departing from the spirit of the present invention. Thus, for example, it will obviously be possible in certain instances to utilize an arc discharge in place of the glow discharge to provide the required negative resistance, and to couple the negative resistance element to the tuned circuit in a variety of ways. Furthermore, any of a variety of detectors may be employed for detecting the variations produced in the superregenerative pulses by received signals, including that class of detectors which operate to detect variations in the peak amplitudes attained by the oscillations during relatively short periods of unquenching.

I claim:

1. A superregenerative amplifier, comprising, in combination: a relaxation oscillator including a gaseous discharge device having an anode element and a cathode element, said relaxation oscillator being operative to render said discharge device intermittently conductive during time-spaced intervals whereby said discharge device is caused to present a negative resistance between said anode and cathode elements during said intervals of conduction, and a tuned circuit connected effectively between said anode and cathode elements of said discharge device and having an equivalent parallel resistance which is greater than the absolute value of said negative resistance presented by said discharge device during at least portions of said intervals of conduction therein, thereby intermittently to overcome the damping of said tuned circuit and to produce pulses of superregenerative oscillations therein, means for supplying said tuned circuit with envelope-modulated carrier-wave signals to modify said superregenerative pulses in accordance with said envelope modulation, and means for detecting variations in said superregenerative pulses.

2. A superregenerative amplifier in accordance with claim 1, in which said gaseous discharge device is characterized by a predetermined value of ignition potential, and in which said relaxation oscillator comprises a source of potential in excess of said ignition potential, impedance means connecting said source of potential to said discharge device, and an energy storage device connected effectively in parallel with said discharge device.

References Cited in the file of this patent

UNITED STATES PATENTS

| | | |
|---|---|---|
| 1,893,029 | Hund | Jan. 3, 1933 |
| 2,139,023 | Kock | Dec. 6, 1938 |
| 2,235,667 | Blount | Mar. 18, 1941 |
| 2,333,119 | Packard | Nov. 2, 1943 |

FOREIGN PATENTS

| | | |
|---|---|---|
| 423,697 | Germany | Jan. 30, 1923 |

OTHER REFERENCES

Der Induktive Climmentladungsoszillator und Sein Anwendungsmoglichkeiten, W. E. Kock, Zeitschrift Fur Technische Physik, No. 10, 1934 (pp. 377–384).